United States Patent [19]
Ruhl, Jr. et al.

[11] Patent Number: 5,282,014
[45] Date of Patent: Jan. 25, 1994

[54] LASER RANGEFINDER TESTING SYSTEM INCORPORATIONG RANGE SIMULATION

[75] Inventors: Joseph W. Ruhl, Jr., Dominguez; Arnold E. Glick, Los Angeles, both of Calif.

[73] Assignee: Hughes Aircraft Company, Los Angeles, Calif.

[21] Appl. No.: 989,405

[22] Filed: Dec. 11, 1992

[51] Int. Cl.$^5$ .................. G01C 3/08; G01N 21/00; G09B 9/00

[52] U.S. Cl. .................... 356/5; 356/73; 434/1; 434/4

[58] Field of Search .............. 356/5, 73; 434/1, 4

[56] References Cited

U.S. PATENT DOCUMENTS

| | | |
|---|---|---|
| 4,342,514 | 8/1982 | Mathews ................... 356/5 |
| 5,133,663 | 7/1992 | Willingham et al. ........ 434/2 |
| 5,138,325 | 8/1992 | Koury .................... 342/169 |

*Primary Examiner*—Stephen C. Buczinski
*Attorney, Agent, or Firm*—Michael W. Sales; Wanda K. Denson-Low

[57] ABSTRACT

A range extinction simulator system that simulates an outdoor laser test range in a relatively small area, which provides for a computer controlled, electronic laser range simulator used to test laser rangefinders. The system evaluates a laser rangefinder's output energy and programs a laser transmitter to fire into the rangefinder at a specific optical power level needed to simulate a return signal from a target for a given range, atmospheric attenuation, and target reflectivity. This invention allows laser rangefinders to be tested without the necessity of a long distance (typically outdoor) laser range. The system provides for a significant cost savings over current test systems and improves the ability to perform varied tests on laser rangefinders. The specific advantages that are realized are the elimination of the outdoor, fixed range, laser test facility with its associated maintenance and safety problems; the elimination of the necessity to move hardware to be tested from the manufacturing floor or development laboratory to the outdoor laser range for testing; the ability to test laser rangefinders during bad weather; and the ability to test laser rangefinders at variable ranges, target reflectivities, and atmospheric conditions, rather than at a single fixed range, single target reflectivity, and uncontrolled atmospheric conditions.

6 Claims, 9 Drawing Sheets

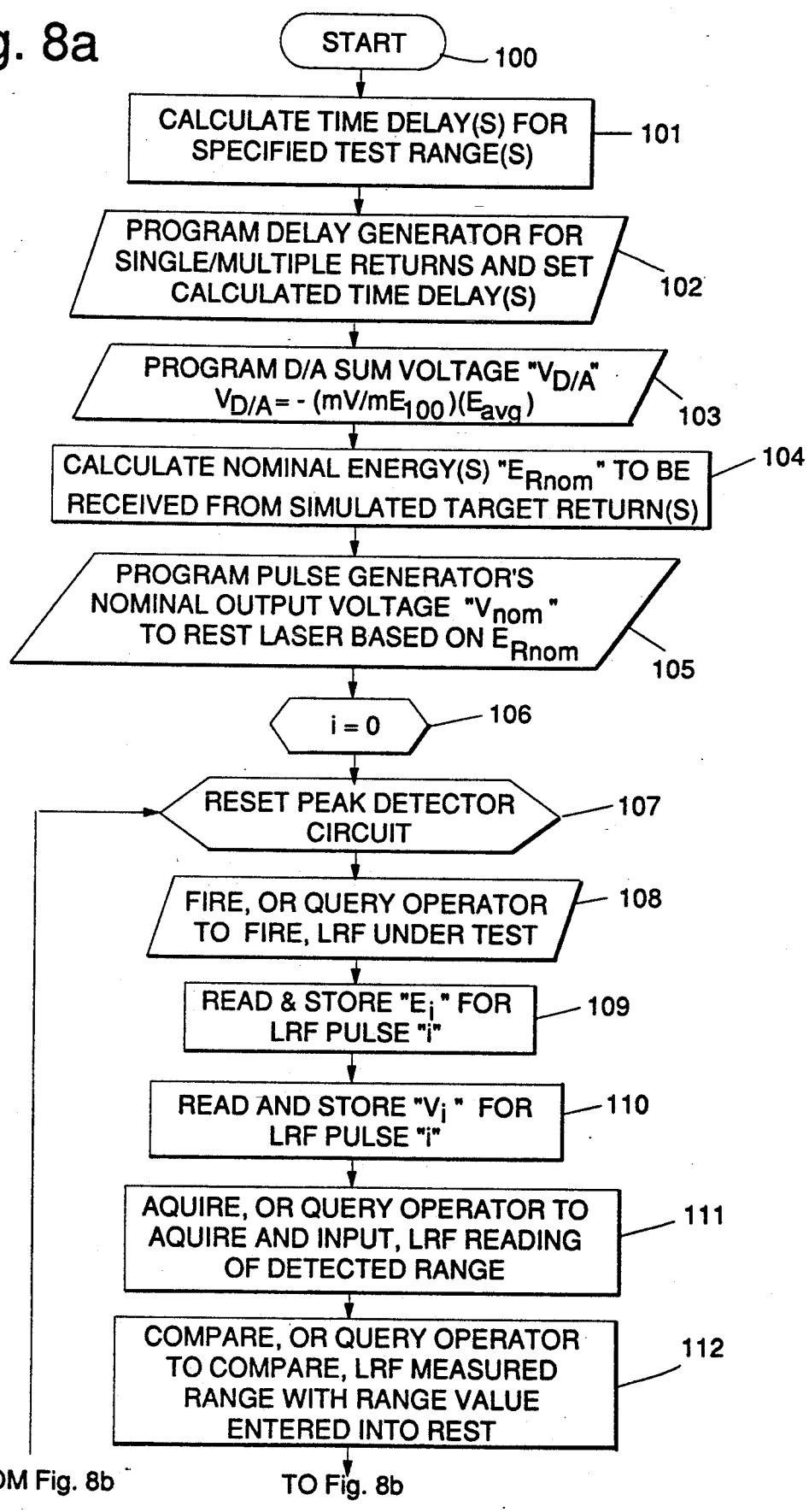

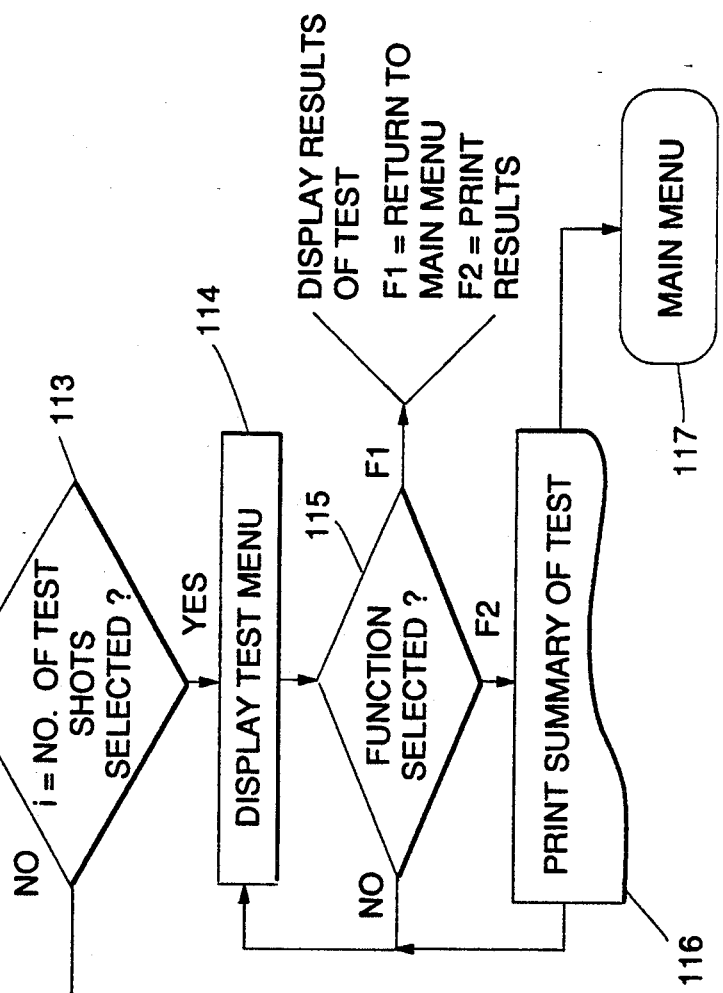

LASER RANGEFINDER TESTING SYSTEM INCORPORATIONG RANGE SIMULATION

BACKGROUND

The present invention relates generally to manufacturing test equipment, and more particularly, to laser rangefinder test equipment that provides for laser range simulation.

In the early 1970's, the assignee of the present invention developed a range simulator known as a simulated optical range target (SORT). This range simulator utilized a long aluminum clad optical fiber, a termination mirror, and a thick lens collimator to simulate a target at a given distance. In operation, the SORT is placed in front of a laser rangefinder under test, the center of the laser rangefinder's reticule is superimposed on the SORT's optical fiber and the laser rangefinder is fired. The output pulse of laser light from the laser rangefinder is attenuated and focused by the thick lens collimator onto the single long optical fiber. The light travels down the fiber until it reaches the termination mirror, i.e., the simulated target, placed at the end of the fiber. Upon striking the termination mirror, the laser light is reflected back up the fiber, back through the thick lens collimator, and into the laser rangefinder. The rangefinder then calculates the range of the simulated target so that an operator may compare the calculated range to the calibrated range for the particular SORT being used. A laser rangefinder determines target range by calculating the time needed for the laser light emitted by the laser rangefinder's laser to travel to a target and return to the laser rangefinder. Although the simulated optical range target is still in limited use, it suffers from several major drawbacks.

Because the glass optical fiber used in the SORT does not transmit light at mid and far infrared wavelengths, i.e., wavelengths beyond 2,000 nanometers (nm), the simulated optical range target cannot be used to test laser rangefinders which operate at wavelengths beyond 2,000 nm. A common example of a laser rangefinder which operates in the far infrared region of the electromagnetic spectrum is the $CO_2$ laser rangefinder which operates at 10,060 nm. Optical fibers which transmit light in the infrared wavelengths currently do not exist in a form that could be adapted for use with the SORT. Another limitation is the physical length of the optical fiber cannot be increased once a SORT is manufactured, the simulated target range is therefore not variable but limited to that range established at the time the particular SORT was constructed.

Other limitations with SORT revolve around its calibration. A laser target range facility is needed to calibrate the simulated optical range target. This facility, usually constructed outdoors, typically requires at least one laser target placed at a visually unobstructed minimum surveyed distance in excess of 200 meters (typically 500 meters) from the operational laser rangefinder which will be used in the SORT calibration. The laser rangefinder is first fired at the real target and its calculated range compared to the surveyed range of the test target. This verifies the proper operation of the laser rangefinder. The rangefinder is then used to calibrated the SORT. Since real laser target range facilities are extremely costly to construct and maintain and since the propagation of laser radiation through the atmosphere is susceptible to adverse weather conditions, the calibrated value, of a particular SORT, is typically verified only once (at the time of manufacture) and is only as good as visibility and other weather conditions on the day of calibration. Atmospheric conditions, such as (light) scattering, (light) transmission, etc., vary daily (or even hourly), an absolute, repeatable, calibration of a particular SORT can therefore rarely be accomplished.

A final major problem with the simulated optical range target is its difficulty in accurately simulating multiple target returns. Most factory acceptance tests require that a laser rangefinder demonstrate its ability to distinguish between two targets placed in close proximity (typically 10-20 meters apart) to each other. Although adequate for in field testing of laser rangefinders, the lack of a reliable absolute calibration and the difficulty in simulating multiple targets has rendered the use of SORT unacceptable for factory acceptance testing.

In the late 1970's, the assignee of the present invention worked on an electronic simulated range device (SRD). This device utilized a laser diode to opto-electrically simulate the return signal that a laser rangefinder would see when fired at a target. In operation, the SRD was placed in front of the laser rangefinder to be tested and the laser rangefinder was connected to the simulated range device through a test connector. The test connector allowed access to the laser rangefinder's "A-trigger" signal. This is the signal generated when the laser rangefinder's laser is fired; it is the signal that starts the laser rangefinders range counter circuit. A return signal delay time was set into the SRD's electronics prior to testing the laser rangefinder. This delay time would correspond to the time it would normally take for the laser rangefinder's emitted laser light to travel a particular distance (target range) and return to the laser rangefinder under test.

An operator would then fire the laser rangefinder to begin the test. Upon firing, the laser rangefinder's "A-trigger" started the simulated range device's counter and at the selected delay time, the simulated range device fired its laser diode into the laser rangefinder's receiver to simulate the target's return signal. The operator could then compare the laser rangefinder's calculated range to the range for the specific delay time set on the simulated range device. For convenience, the SRD's delay time was displayed on the SRD's control panel as a range. Although the simulated range device allowed limited testing with laser rangefinders that utilize non-common transmitter and receiver optics, SRD development was suspended after several years because of its inability to successfully test laser rangefinders that utilize common optical paths. The simulated range device suffered from several shortcomings.

The simulated range device would not work with laser rangefinders that utilize common optical paths because with common optical paths, the SRD's diode laser was destroyed by its exposure to the laser radiation generated by the laser rangefinder's output beam when the laser rangefinder under test was fired. The SRD only operated at two wavelength (694.3 nm and 1060 nm) and could therefore only be used to test laser rangefinder's operating at these wavelengths. Since the output energy of the laser rangefinder under test was not measured, no attempt was made to set the SRD laser diode's pulse to an output energy level that would represent the amount of energy that the laser rangefinder would see reflected from a real target. No attempt was made to set the optical characteristics (polarization, pulse width, etc.) of the SRD's diode laser's output pulse to represent the optical characteristics of that the laser rangefinder would see reflected from a real target.

Accordingly, it is an objective of the present invention to provide for a target range/extinction simulator that can be electronically calibrated and eliminates the need for an outdoor laser test facility. It is another objective to allow a laser rangefinder that utilizes a common transmitter and receiver optical path to be tested against both single and multiple simulated targets. It is a further objective to provide for manufacturing test equipment that permits increased production flow (thus reducing cost) by eliminating the necessity to move laser rangefinders to and from a laser test facility and to further provide for field test equipment that permits testing of laser rangefinders in areas where laser operation would otherwise be prohibited because of eye injury hazards.

SUMMARY OF THE INVENTION

In order to overcome the limitations of conventional laser rangefinder test systems, and to provide for the above advantages, the present invention comprises a range/extinction simulation tester (REST) system that simulates a laser range test facility in a relatively small package. More specifically, the REST system is a computer controlled, electronic laser range simulator used to test laser rangefinders. The range/extinction simulation tester system measures the output energy of a laser rangefinder under test. It then utilizes this measured energy value in conjunction with computer simulated modifiers representing round trip time of the light pulse to the target (range/2), atmospheric effects (transmission, scattering and absorption) and simulated target reflectivity to set the delay time and output energy level of its internal laser transmitter to the specific energy level needed to simulate the reflected signal that the laser rangefinder would see if it were fired at a real target under the same conditions.

More specifically, the present invention is implemented by using an optical scatter plate (typically a target plate fabricated from barium sulfate) to model real world diffuse targets, to provide attenuation of the laser rangefinder's output beam, and to provides for a Lambertian distribution of the return laser energy. Furthermore, the present invention accurately and efficiently controls the optical power returned to the laser rangefinder under test from the simulated target. The present invention may be adapted to measure the output energy of the laser rangefinder under test's output pulse over a given time period and for a plurality of pulses, say 20 pulses for example and compute the average output energy per pulse. This average output energy is then used in conjunction with a computer model of the atmospheric and target conditions to set the average power level of the simulated target's reflected energy. This simulated target reflection is generated by the internal laser transmitter of the REST system.

The present invention is a real time system, in that when testing is performed on the laser rangefinder under test its output pulse energy is measured for each shot and compared to the anticipated average per pulse output energy as previously computed. When the laser rangefinder under test is fired for the first test shot the simulated target's reflected energy will be based on the previously computed average output pulse's energy level. The measured value of that first pulse will meanwhile be compared to the previously computed average per pulse energy and the differences between the measure and anticipated per pulse energies, if any, will be used as a correction factor to the average power level of the simulated target's reflected energy. The simulated target's reflected energy will therefore be set to the exact value which a real target, under the specified conditions, would reflect back into the laser rangefinder under test.

The purpose of the present invention is to allow laser rangefinders to be tested without the necessity of utilizing a long distance (typically outdoor) laser range facility. The utilization of the REST system results in a significant cost savings over current test methods and improves the ability to perform varied tests on laser rangefinders. The specific advantages that are realized are the elimination of a range test facility and its associated maintenance costs and safety problems; the elimination of the necessity to move hardware to be tested from the manufacturing facility or development laboratory to the range test facility for testing; the ability to test laser rangefinders during bad weather; and the ability to test laser rangefinders at variable ranges, target reflectivities, and atmospheric conditions, rather than at a single or small number of fixed ranges, a single target reflectivity, and uncontrolled atmospheric conditions.

Significant cost savings are experienced through the use of the range/extinction simulation tester and the elimination of outdoor manufacturing laser range facilities. Incorporating the REST system into manufacturing test equipment increases production flow, thus reducing cost, and eliminates the necessity to move laser rangefinders to and from a laser range for testing. Incorporating the range/extinction simulation tester into field test equipment also provides for testing of laser rangefinders in areas where laser operation would otherwise be prohibited because of eye injury hazards.

BRIEF DESCRIPTION OF THE DRAWINGS

The various features and advantages of the present invention may be more readily understood with reference to the following detailed description taken in conjunction with the accompanying drawings, wherein like reference numerals designate like structured elements, and in which:

FIGS. 8a and 8b show a functional flow diagram employed in the system of FIGS. 1-3 showing the test procedure thereof.

DETAILED DESCRIPTION

Figure 1:
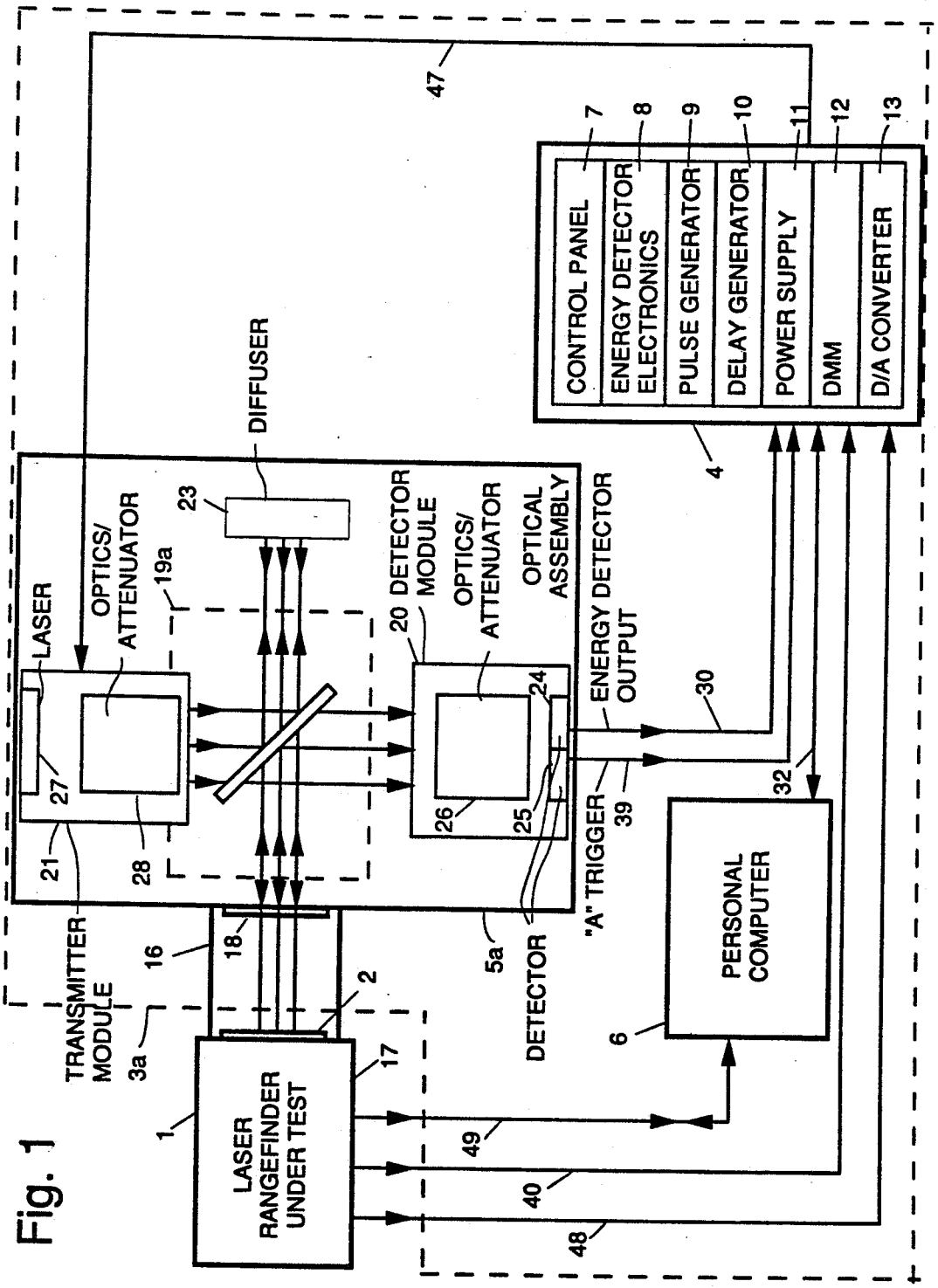
FIG. 1 shows a first embodiment of a laser range/extinction simulation tester (REST) system made in accordance with the principles of the present invention.

Referring to the drawing figures, FIG. 1 shows a first embodiment of a laser range/extinction simulation tester (REST) system 3 made in accordance with the principles of the present invention. The REST system 3 is an electronic, computer controlled, laser range simulator that allows a laser rangefinder 1 to be safely tested without the need of an outdoor laser test range. The REST system 3 is comprised of an electronics assembly 4, an optical assembly 5, and a personal computer 6.

The electronics assembly 4 comprises a control panel 7, the programmable energy detector electronics 8, a programmable pulse generator 9, a programmable delay generator 10, a system power supply 11, a programmable digital volt meter (DMM) 12 and a programmable digital to analog converter (D/A) 13. The energy detector electronics 8 comprises an energy readout display 14 and internal "A" trigger electronics 15. The optical assembly 5 comprises a laser safety shroud 16 and an electrical interlock switch 17 between laser rangefinder 1 to shroud 16, an entrance window 18, a beamsplitter module 19, an energy detector module 20, and a transmitter module 21.

The optical assembly 5 is modularized to allow the REST system 3 to be adapted for use with laser rangefinders 1 operating at significantly different wavelengths. The beamsplitter module 19 comprises an optical beamsplitter 22 and a barium sulfate diffuser 23 which acts to scatter the percentage of the laser radiation that exits the beamsplitter 22 and provide a Lambertian distribution of the radiation from a laser 27 of the REST system 3. The energy detector module 20 comprises an energy detector 24 for measuring the output energy of the laser rangefinder under test 1, an "A" trigger energy detector 25 to provide the REST system 3 with an internal "A" trigger signal, and the necessary optics 26 needed to collect and attenuate, if necessary, that part of the laser radiation that exits the beamsplitter 22 and focuses that energy onto the detectors 24, 25. The transmitter module 21 comprises the laser 27, (typically a diode laser) that operates at the same wavelength as the laser rangefinder under test 1. This laser 27 is used to provide a simulated target return signal. The transmitter module 21 also comprises the optics 28 necessary to attenuate, if necessary, and characterize the simulated return signal so that it is optically representative of an actual laser reflection from a real world target.

Figure 2:
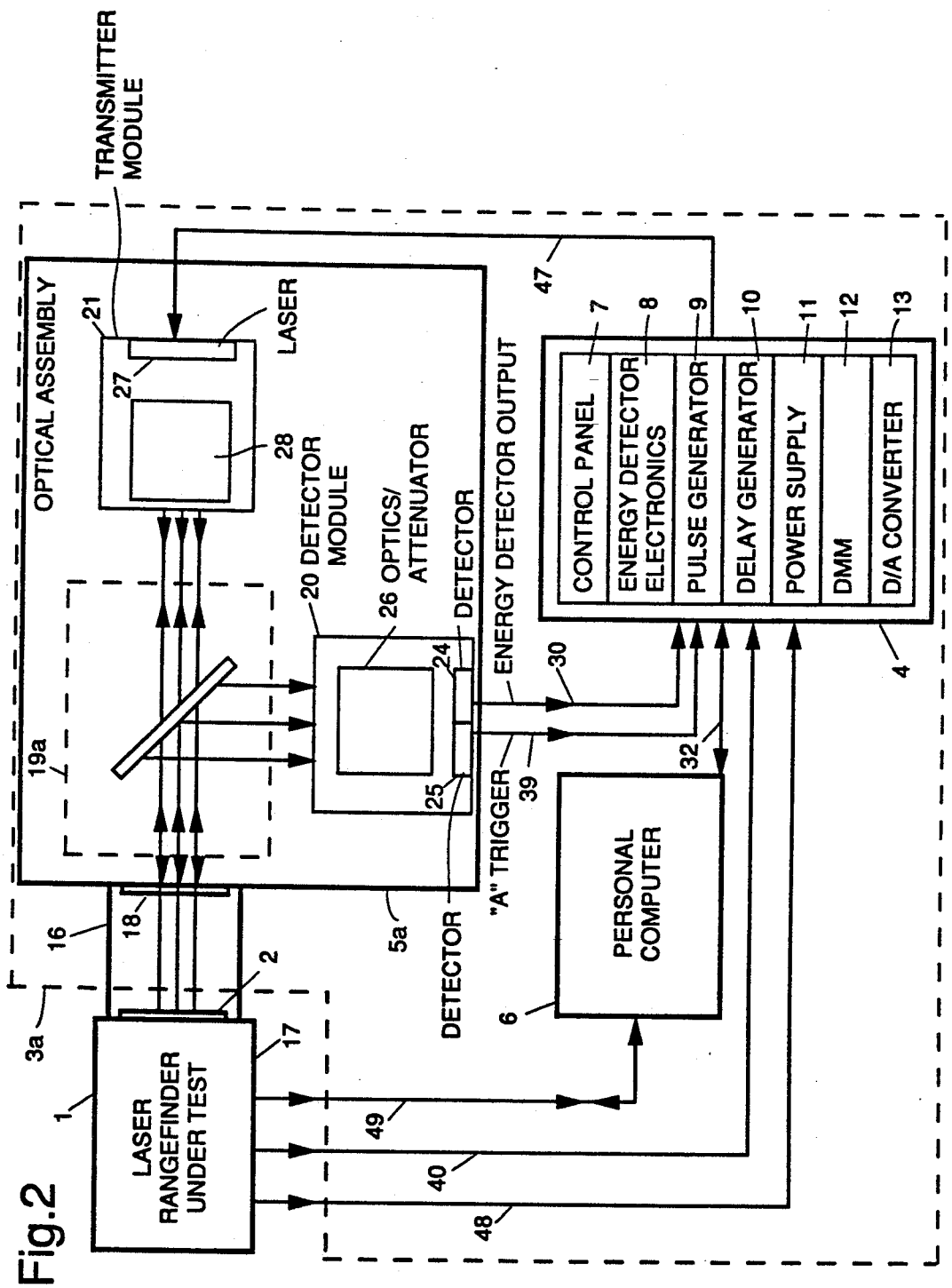
FIG. 2 shows a second embodiment of the REST system made in accordance with the principles of the present invention.

FIG. 2 shows a second embodiment of the laser range/extinction simulation tester (REST) system 3a made in accordance with the principles of the present invention. This system 3a is substantially the same as the system 3 of FIG. 1. The difference is that the barium sulfate diffuser 23 has been eliminated from the beamsplitter assembly 20a and the transmitter module 21 has been relocated. This reduces weight and cost of the optical assembly 5a for those laser rangefinders 1 that have low output power and less stringent return signal requirements. This REST system 3a is constructed and operates in a manner substantially the same as the REST system 3 described above.

Figure 3:
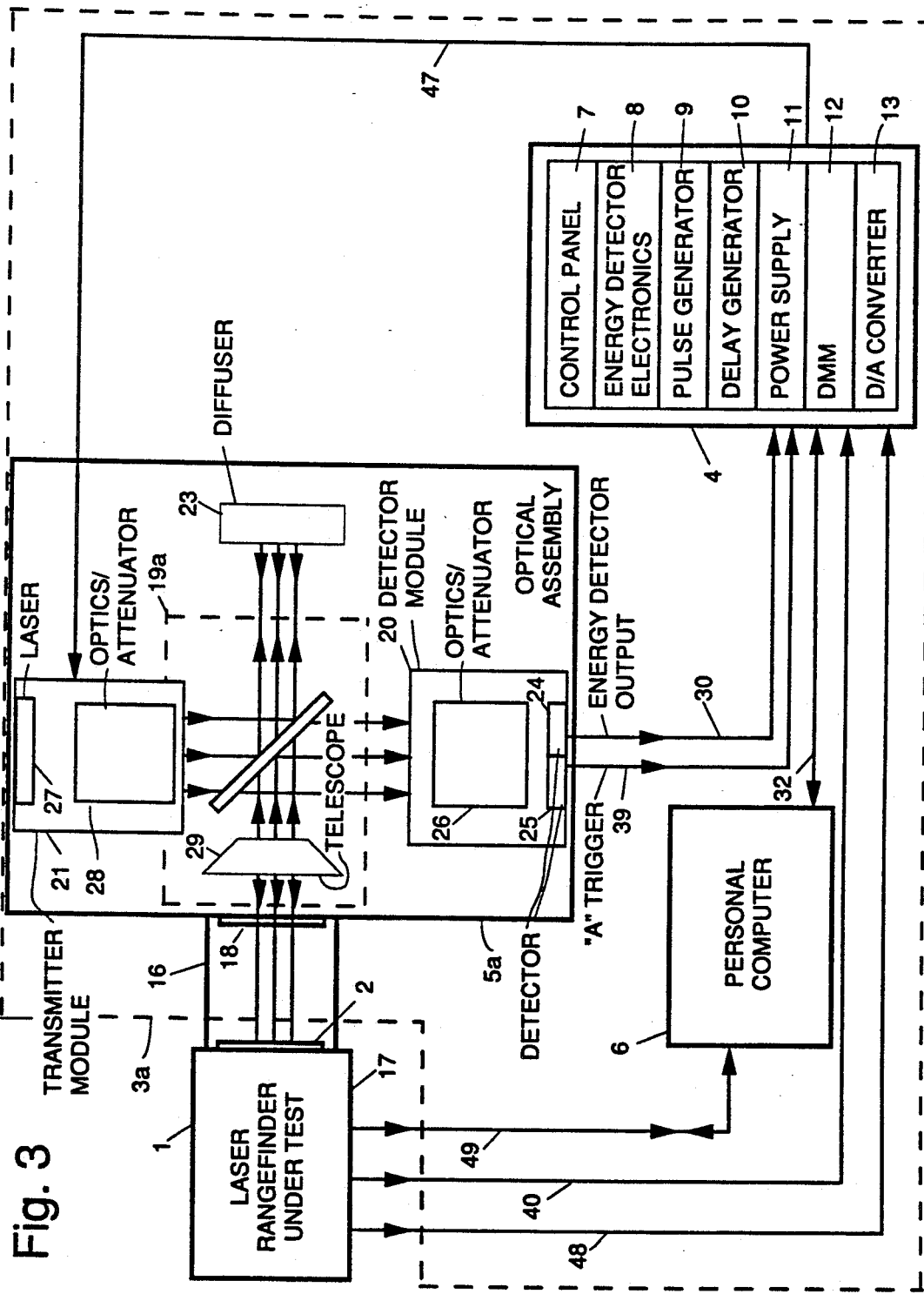
FIG. 3 shows a third embodiment of the REST system made in accordance with the principles of the present invention.

FIG. 3 shows a third embodiment of the laser range/extinction simulation tester (REST) system 3b made in accordance with the principles of the present invention. This system 3b is substantially the same as the other systems 3, 3a. The difference is that an afocal telescope assembly 29 has been added between the entrance window 18 and the beamsplitter module 19 of the optical assembly 5b. This allows the REST system 3b to be used to test large output aperture laser rangefinders 1. This REST 3b is constructed and operates in a manner substantially the same as the other REST systems 3, 3a described above.

Figure 4:
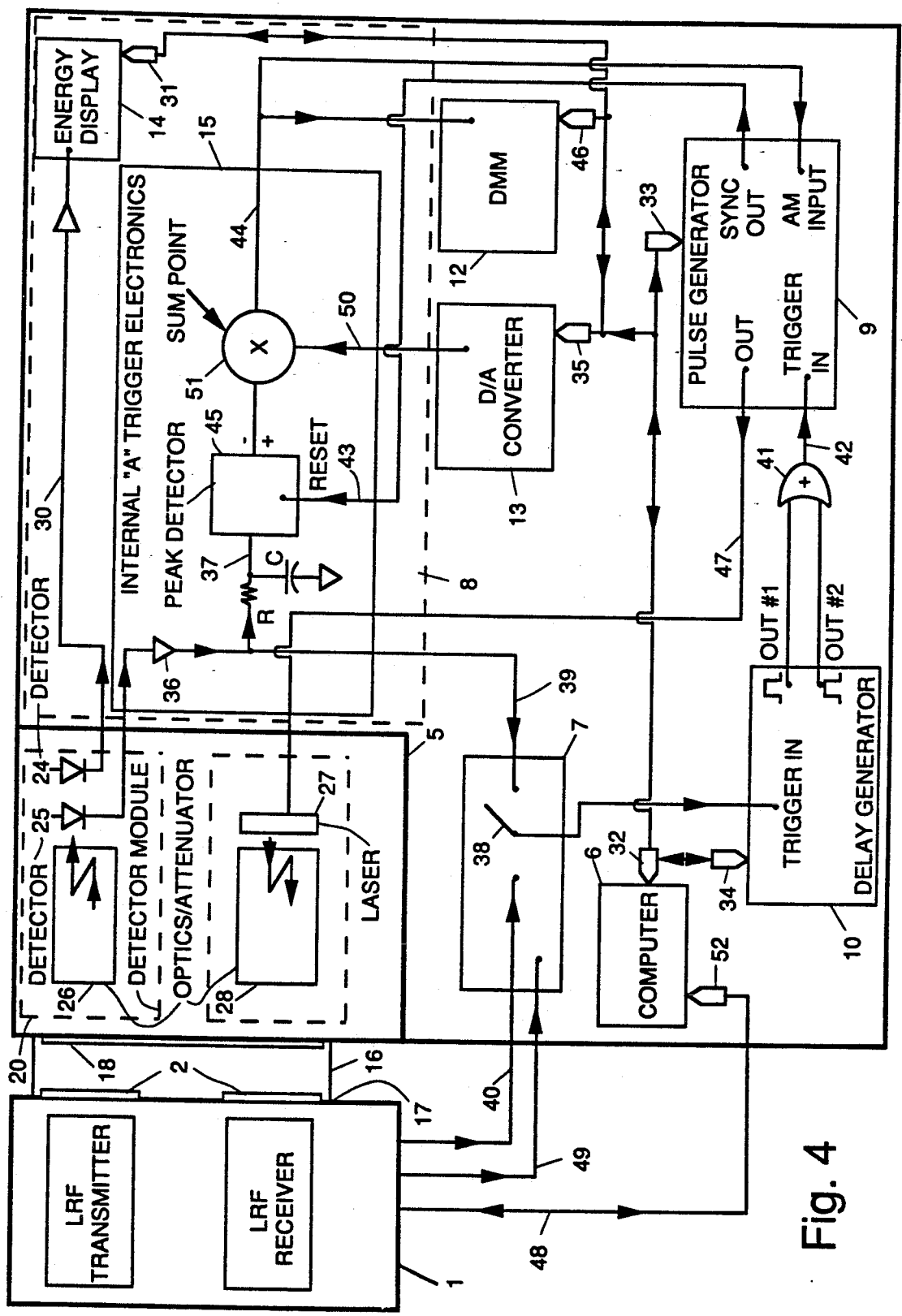
FIG. 4 shows an embodiment of the electronics of the system of FIGS. 1-3.

FIG. 4 shows an embodiment of the electronics contained in the electronics assembly 4 and the optical assemblies 5, 5a, 5b of the range/extinction simulation tester (REST) systems 3, 3a, 3b of FIG. 1-3 including related other parts. The electronics contained within the energy detector module 20 comprises the two laser energy detectors 24, 25 and their associated detector bias electronics. An absolute energy detector 24 is calibrated to measure the absolute output energy of the laser rangefinder under test 1. An output signal 30 of the absolute energy detector 24 is coupled directly to the energy readout display 14 (LCD, for example) of the energy detector electronics 8. The output energy of the laser rangefinder under test 1 for each pulse of its laser is displayed on the display 14 located on a front panel of the electronics assembly 4.

The measured energy value for each laser rangefinder output pulse is also transmitted over an IEEE-488 buss of the the energy detector electronics 31 to the computer 6. The computer 6 uses this information to calculate the average per pulse output energy of the laser rangefinder under test 1 and to "calibrate" the proportionality of each output electrical pulse obtained from the "A" trigger detector 25. The average per pulse output energy is processed by a computer program that runs in the computer 6 to determine the nominal output amplitude to be provided by the laser 21 that is needed to simulate a target return pulse for the given set of test conditions. The computer 6 then utilizes its IEEE-488 buss 32 to program the pulse generator 9 through its IEEE-488 buss 33, the delay generator 10 through its IEEE-488 buss 34 and the D/A converter 13 through its IEEE-488 buss 35.

The second "A" trigger energy detector 25 contained within the energy detector module 20 serves two functions. The first function of this detector is to detect any pulse to pulse output energy variation of the laser rangefinder under test 1. If the output energy of the laser under test 1 varies from pulse to pulse, the proportional amplitude variation of the signal generated by this detector 25 allows the pulse generator 9 to adjust the output energy pulse of the laser 27. The "A" trigger detector 25 is also used to provide a real time internal "A" trigger signal for the REST system 3, 3a, 3b. The "A" trigger signal is amplified by an amplifier 36 in the internal "A" trigger electronics 15. This amplified signal is then coupled to an "RC" circuit 37 in the internal "A" trigger electronics 15 and to the internal side of a trigger selector switch 38, located on the control panel 7. The trigger selector switch 38 allows an operator to select either the internal "A" trigger signal 39 generated by the "A" trigger detector 25 or an optional external "A" trigger signal 40 which may be available from the laser under test 1. The "A" trigger signal either internally generated 39 or externally generated 40 is provided to the trigger input of the delay generator 10.

The delay generator 10 is comprised of counter circuits that provide output timing pulses to an "OR" gate 41, which in turn provides triggering signals 42 to the pulse generator 9. The pulse generator 9 controls the firing of the laser 27. It is programmed by the computer 6 through the IEEE-488 computer buss 33 in the delay generator 10. The programming instructs the pulse generator 9 to set the laser 27 to fire at a nominal energy level determined by the computer 6, and to increase or decrease the programmed nominal energy level by the analog signal 44 generated by the internal "A" trigger electronics 15. The computer 6 also instructs the pulse generator 9 to fire the laser 27 whenever the generator 9 receives a trigger pulse 42 from the "OR" gate 41 and to generate a "reset" signal 43 for the internal "A" trigger electronics 15.

The internal "A" trigger electronics 15 is comprised of analog circuitry used to generate an energy scaling or correction factor signal 44 based on pulse to pulse energy variation in the output pulse from the laser rangefinder 1. The electronics 15 receives the input signal 39 from the "A" trigger detector amplifier 36. The width of this narrow input signal is stretched to approximately 0.5 microseconds by an "RC" circuit 37. The peak amplitude value of the stretched pulse is captured in a peak detector circuit 45 and summed with the programmed output 50 of the D/A converter 13. The summed output 44 is measured by the DMM 12, transmitted to the computer 6 via the IEEE-488 buss 46 in the DMM 12 and also sent to the pulse generator 9. The computer 6 uses the summed output 44 from the peak detector circuit and the D/A converter to calculate a laser pulse to laser pulse energy correction factor. The computer 6 then programs the D/A converter 13 to deliver a voltage such that the next summed output 44 amplitude modulates the previously set nominal output amplitude of the pulse generator 9 to the laser 27. The output amplitude 47 of the pulse generator thus sets the output energy of the laser 27 based on the actual output energy of the laser under test 1 delayed by one shot and fires the laser 27 in response to a trigger signal 42. Once the laser 27 has fired, the pulse generator 9 generates a reset signal 43 for the peak detector circuit 45.

The range/extinction simulation tester system 3, 3a, 3b is effectively a laser rangefinder used in reverse. The laser rangefinder 1 calculates the range to a target by sending out a pulse of laser light and counting the time it takes for the light to travel to a target and return to the laser rangefinder's receiver. Since the speed of light is essentially constant, the round trip travel time can be used to calculate the distance from the laser rangefinder 1 to the target. The REST system 3 determines if the laser rangefinder 1 is ranging properly in much the same manner. All REST systems 3, 3a, 3b operate in the following manner. The operator places the laser rangefinder under test 1 in front of the optical assembly 5 and aims the output aperture 2 of the laser rangefinder 1 into entrance window 18. The operator insures that the laser safety shroud 16 is properly secured such that the shroud's electrical interlock switch 17 closes. The laser safety shroud 17 insures that all laser radiation from the laser rangefinder under test is contained within the optical assembly 5. To insure personnel safety, the electrical interlock switch 17 makes certain that the shroud 17 is secured in place before either the laser rangefinder under test 1 or the laser 27 can be fired. The output of the laser 27 is below the Class I (eyesafe) accessible emission limit.

If the laser rangefinder 1 has a test connector or computer data line which allows access to the its "A" trigger signal 40 and its range display readout 48, the operator may choose to electrically connect the laser rangefinder 1 to the REST system 3. If an external trigger is used for testing the operator sets the trigger selector switch 38 located on the REST control panel 7 to the "external A trigger" position. If the laser rangefinder 1 does not have an external trigger connection, or if the operator chooses not to use an external trigger, the trigger selector switch 38 located on the control panel 7 is placed in the "internal A trigger" position. If the laser rangefinder 1 is normally operated by a computer system and has a computer operating (and data) buss, that the buss 49 may be connected to an optional laser rangefinder operating buss 52 of the computer 6 so that the laser rangefinder 1 may be operated directly by the REST system 3. The optional external range readout 48 allows the computer 6 to automatically compare the simulated range of the REST system 3 to the range computed by the laser rangefinder 1 during testing. The optional external "A" trigger input 40 allows the electronics assembly 4 to use the laser rangefinder's "A" trigger to start the internal timing circuits of the delay generator 10 contained within the electronics assembly 4. The internal counter of the REST system 3 may be started by either an external trigger, such as the laser rangefinder's "A-trigger" signal 40, or by the internal "A" trigger signal 39 generated by the "A" trigger detector 25.

Referring to FIGS. 5–8b, they shows functional flow diagrams employed in the computer program implemented in the REST system 3, 3a, 3b of FIGS. 1–3 showing its main menu, change menu, an energy calibration procedure, and test procedure, which are helpful in understanding the operation of the present invention. The operator turns "ON" the REST system 3 utilizing controls located on the control panel 7 of the electronics assembly 4. If the laser safety shroud's electrical interlock switch 17 is not closed, the REST system 3 will not turn "ON". After the computer 6 performs its startup functions 60, a main test menu 61 is displayed for the operator's convenience. The operator then selects 62, based on the type of laser rangefinder 1 to be tested, either a default set of test parameters 63, or a "change parameter" setting 66. Selection of the "change parameter" setting 66 changes the display to the change menu of FIG. 6.

A default selection allows the computer 6 to call up a set of test parameters stored in computer memory based on the acceptance specifications for a particular laser rangefinder 1. An example of a default setting (taken from the Ground Laser Locator Designator (GLLD) system) includes 2 targets located at ranges of 480 meters and 500 meters with the 480 meter target overlapping the 500 meter target by 50%, both targets have a diffuse target reflectivity greater than 80%, and with one-way atmospheric attenuation at the 1064 nanometer wavelength band of 0.2. If the "change parameter" setting 66 is selected, the operator must input the changed test parameters 73 (FIG. 6) into the computer 6 for the particular laser rangefinder 1 to be tested. These test parameters include the number of simulated test targets are needed for laser rangefinder testing; the simulated target range(s); the simulated target reflectivities; and the simulated atmospheric conditions, such as transmission losses at the laser operating wavelength due to atmospheric effects. Once the changes are input, the program returns to the main menu 76 of FIG. 5.

After the type of laser is selected 63, or the operator has input the changed parameters 73 and test conditions for a new laser, the computer 6 prompts if the operator wishes to "start the test" 65, again, "change the laser parameters" 66, or "exit the program" 67. If the operator selects "start the test" 65 and if a default set of test parameters was selected 62, the computer 6 begins testing by measuring the nominal output energy 75 of the laser under test 1. If the operator selects "start the test" 65 and if the "change parameter" was selected 66, the operator must first input a set of laser test parameters 73 into the computer 6 before the test can begin.

Figure 7:
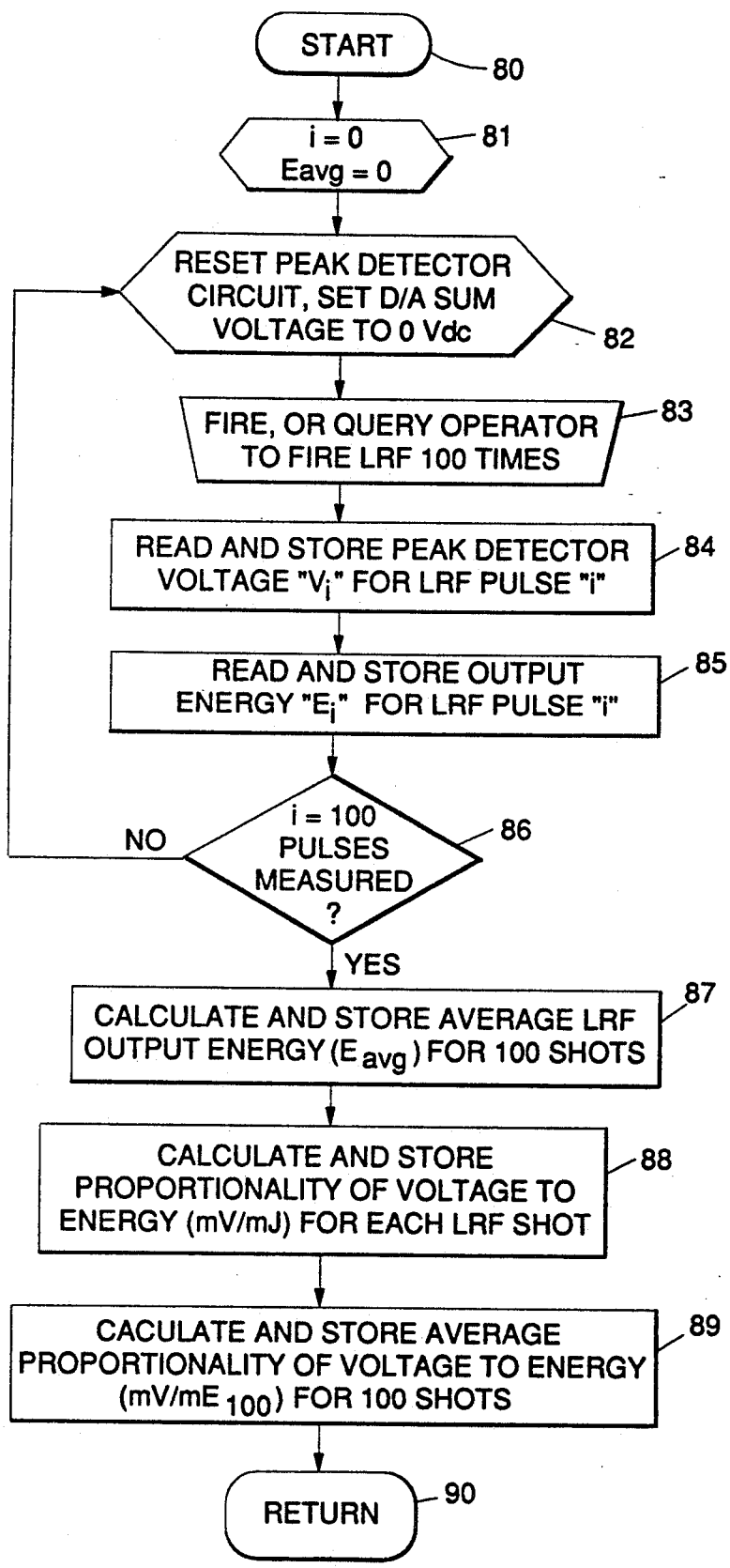
FIG. 7 shows a functional flow diagram employed in the system of FIGS. 1-3 showing an energy calibration procedure thereof.

Referring to FIGS. 7, 8a and 8b, the testing begins with the REST system 3 measuring the output energy of 100 shots of the laser under test 83 and calculating its average per pulse output energy ($E_{avg}$) 87. This is done to "calibrate" the REST system 3 to the laser rangefinder under test 1. The calibration is performed automatically if the laser rangefinder under test 1 is directly controlled by the computer by way of the operating buss 49. If the laser rangefinder under test 1 is not computer controlled, the computer 6 prompts the operator to fire 83 the laser rangefinder under test 1 for a total of 100 shots and then when ready, prompts him 108 to perform the actual range test firing of the laser rangefinder 1. Whether under computer control or manually operated, the test sequence is as follows.

The computer 6 programs 82 the D/A converter 13 by way of the IEEE-488 buss 35 in the D/A converter 13 to provide a summing voltage 50 of 0 Vdc to the output voltage 51 of the peak detector circuit 45 for the next 100 shots of the laser rangefinder under test 1. The output energy of each of the next 100 shots of the laser rangefinder 1 is measured 85 by the energy detector 24, displayed for the operator on the energy display 14 and transmitted to the computer 6 using a the energy detector's EEEE-488 buss 31. At the same time, the output 51 of the peak detector 45 is added to the 0 Vdc output 50 of the A/D converter 13 to form a summed voltage 44. This summed output voltage 44, which in this part of the test sequence is equal to the actual output 51 of the peak detector circuit 45, is measured 84 by the DMM 12 and transmitted to the computer 6 via the DMM's IEEE-488 buss 46.

The summed output voltage 44 and the output energy for each pulse of the 100 laser shots is recorded by the computer 6 and stored in memory. The computer 6 calculates and stores the average per pulse output energy "$E_{avg}$" 87 of the laser rangefinder; calculates and stores the proportionality 88 of each output voltage 44 of the peak detector 45 to the output energy of each laser pulse; and calculates and stores the average proportionality of all the proportionalities of the peak detector voltages to the output energies 89. The computer 6 uses the calculated average per pulse laser rangefinder 1 output energy "$E_{avg}$" in conjunction with previously set laser rangefinder test parameters and atmospheric modeling to determine 104 the nominal output energy, "$E_{Rnom}$" setting for the laser 27. This nominal output energy value of the laser 27 thus represents a nominal simulated target reflection for the assigned test parameters.

The pulse generator 9 is then programmed 105 by the computer 6 using the IEEE-488 buss 33 of the pulse generator 9 to set the nominal driver voltage "$V_{nom}$" for the laser 27 to allow it to fire at this simulated nominal (target) reflected energy level "$E_{Rnom}$". The computer 6 simultaneously calculates 101 the firing delay time(s) needed to simulate the correct target range(s) based on the input test parameters. It then programs 102 the delay generator 10 using the IEEE-488 buss 34 of the delay generator 10 to fire the laser 27 after the programmed delay(s), and after the REST system 3 receives either an internal 39 or an external 40 "A" trigger signal confirming that the laser rangefinder under test 1 has fired.

Finally, the computer 6 calculates a dc summing voltage "$V_{D/A}$" equal in amplitude but opposite in polarity to the product of the average per pulse output energy of the laser rangefinder and ($E_{avg}$) 87 and the average proportionality of all the proportionalities of the peak detector voltages to the output energies 89. The computer 6 programs 103 the D/A converter 13 via its IEEE-488 buss 34 to provide this dc summing voltage "$V_{D/A}$" to the peak detector circuit 45. The computer then sets 106 its shot counter to zero and commands the pulse generator 9 to reset 107 the peak detector circuit. The REST system 3 is now ready to begin laser rangefinder range testing.

The computer 6 either automatically fires 108 the laser rangefinder under test 1 or instructs the operator to fire it. The laser rangefinder 1 fires into the optical assembly 5 where the following occurs. The output pulse of laser light generated by the laser rangefinder 1 enters the optical assembly 5 by passing through the entrance window 18. If the laser rangefinder's output beam diameter is larger then the internal optics of the REST system 3, the beam diameter of the laser rangefinder 1 is reduced in size by the afocal beam expander 29 (FIG. 3b).

The laser pulse then strikes the beamsplitter 22 in the beamsplitter module 19. A percentage of the laser beam passes through the beamsplitter 19 and is scattered by the $BaSO_4$ target 23. The remaining part of the laser rangefinder's output beam that strikes the beamsplitter 19 is reflected into the energy detector module 20 where the laser light is collected by the collecting optics 26, attenuated, if necessary, to a safe (for the detectors 24, 25) energy level, and focused onto the two energy detectors 24, 25. The laser light strikes the energy detector 24 which is calibrated to measure the actual output energy of the laser pulse. This value is transmitted to the computer 6 where it is stored for later evaluation or inspection. The laser light simultaneously strikes the "A" trigger detector 25 which generates an electrical signal 39. This electrical output is amplified by the "A" trigger detector amplifier 36 and sent in two directions.

First, the internal "A" trigger diode's signal is coupled to the RC circuit 37 where the width of the electrical pulse is stretched to approximately 0.5 microseconds and sent to a peak detector circuit 45 which provides a dc voltage output ($V_i$) 51 proportional to the amplitude of the laser energy. This voltage 51 is summed with the previously programmed 103 D/A converter summing voltage "$V_{D/A}$". The resulting summed voltage 44 is measured by the DMM 12 and transmitted to the computer 6 for storage. This voltage ($V_{si}$) 44 is simultaneously supplied to the amplitude modulation input of the pulse generator 9 and acts to modulate the output driver voltage ("$V_{nom}$") 47 of the pulse generator 9 to take into consideration the pulse to pulse output variation of the laser rangefinder under test 1. The energy received "$E_R$" by the laser rangefinder under test 1 therefore simulates a target reflection based on the energy value of the actual transmitted laser pulse, rather then on a nominal or average energy pulse of the laser rangefinder 1.

Second, the internal "A" trigger signal is also coupled to the internal "A" trigger side of the trigger selector switch 28. If the internal "A" trigger position of this switch 38 has been selected, the amplified signal 39 of the A trigger detector 25 travels to the trigger input of the delay generator 10. Regardless of which "A" trigger (internal 39, or external 40) has been selected, the "A" trigger signal starts the delay timer of the delay generator 10.

At the end of the programmed time delay 102 representative of the test range(s), the delay generator 10 triggers the pulse generator 9. The pulse generator output the correct driver voltage 47, ($V_{nom}$ modulated by $V_{si}$) which fires the laser 27. The laser pulse passes through the beam forming optics 28 used to insure that the return signal that the laser rangefinder 1 sees from the range extinction simulator system 3 is similar in size and optical characteristics to the return reflection that the laser rangefinder 1 would see if it were fired at a real target. The output of the REST system 3 is then directed by the beamsplitter 22 of the beamsplitter module 19 through the entrance window 18 and enters the laser rangefinder 1. The simulated range return signal(s) are received by the receiver diode in the laser rangefinder 1 and stops the counter circuits.

The laser rangefinder 1 computes the range to the simulated target. If the laser rangefinder 1 is operated automatically by the computer 6, the computer 6 acquires 111 the range distance measured by the laser rangefinder under test 1 and compares 112 this measured range to the number of targets and the simulated test target range that REST system 3 was originally set to simulate. If the laser rangefinder 1 is operated manually, the operator is queried 111 to acquire the measured range value from the laser rangefinder's display and enter this measured value into computer memory, the computer 6 then compares 112 the range measured by the laser rangefinder to the number of targets and the simulated test target range that the REST system 3 was originally set to simulate. The computer 6 checks 113 to see if the upper limit of test shots originally set 63, 73 has been reached. If the upper limit has not been reached the program loops back and continues ranging until the total number of test shots has been reached. A test menu is then displayed 114, which is used to provide 115 a printed summary 116 of the test results.

Figure 5:
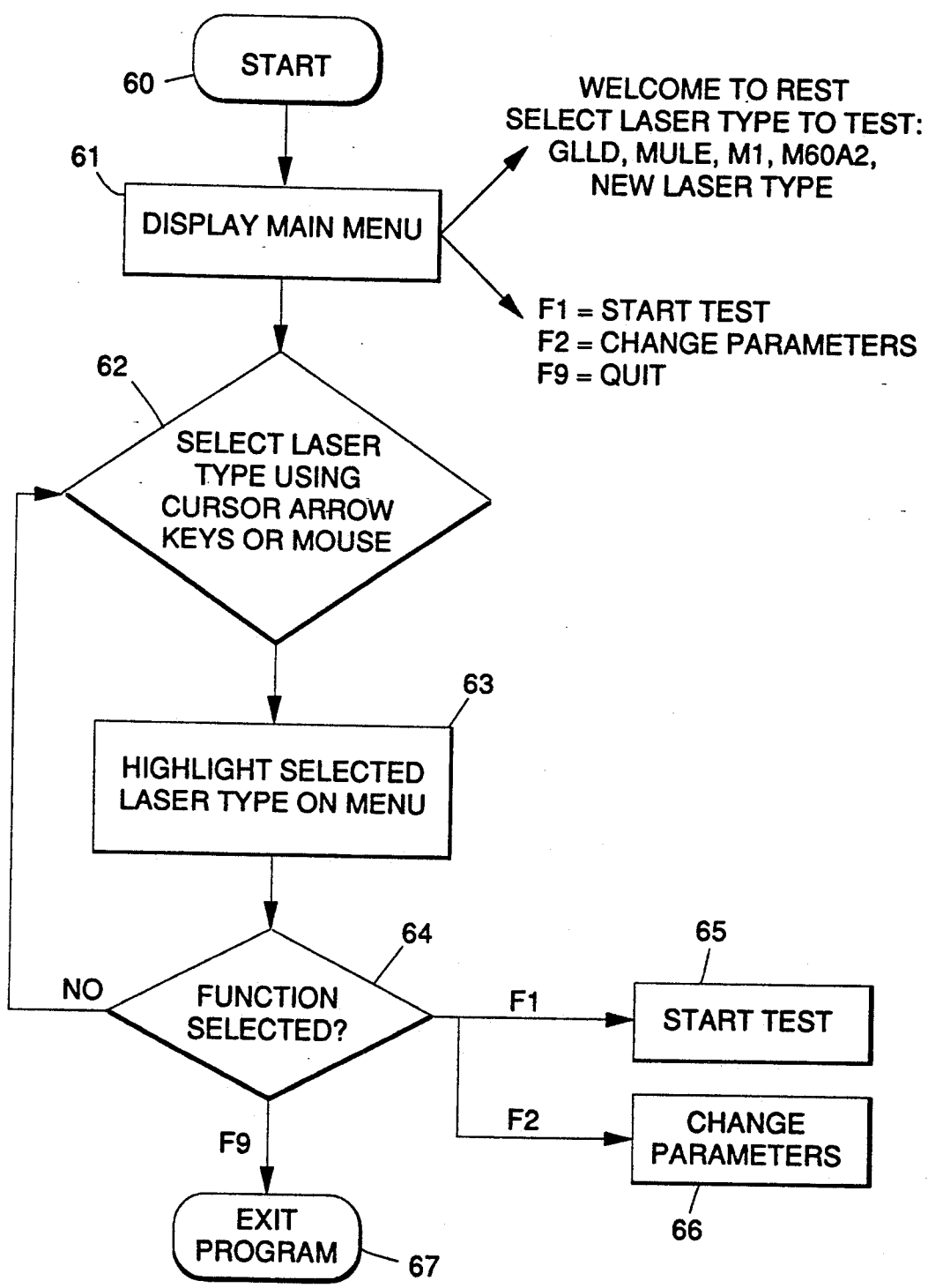
FIG. 5 shows a functional flow diagram employed in the system of FIGS. 1-3 showing a main menu thereof.

FIG. 5 shows a first functional flow diagram the operating software program employed in the REST system 3. The program starts 60 and a main menu 61 is displayed. The user is prompted 62 to select the laser type that is to be tested by using cursor keys or a mouse. The selected laser type is then highlighted 63 on the menu. Then the program responds to the depressing of a displayed function key (F1, F2, F9) by starting the test 65, changing a parameter 66 or exiting the program 67. If an improper key is depressed, the program loops to the selection screen 62.

Figure 6:
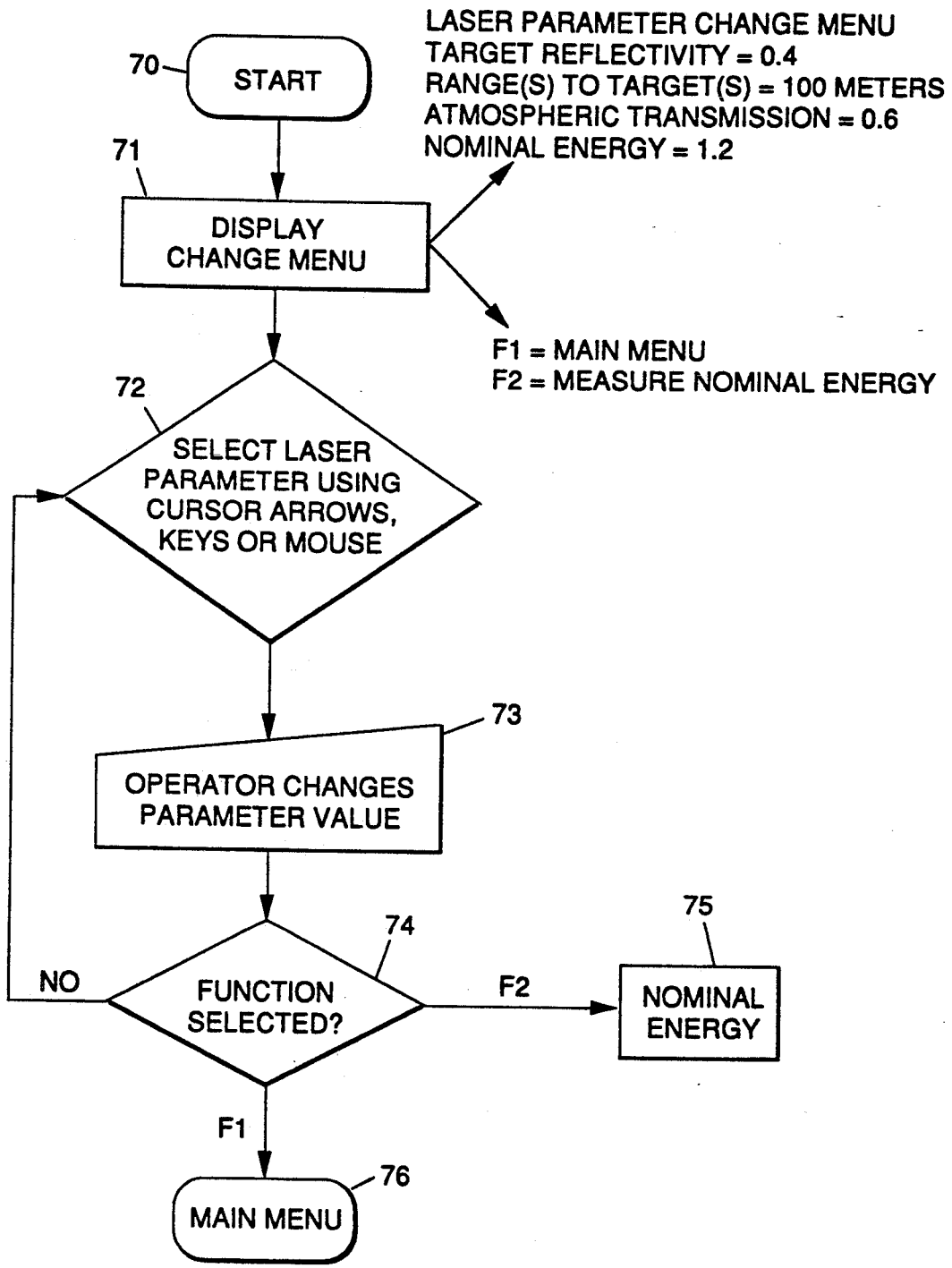
FIG. 6 shows a functional flow diagram employed in the system of FIGS. 1-3 showing a change menu thereof.

FIG. 6 shows a second functional flow diagram of the software program employed by the REST system 3. This flow diagram illustrates a change menu thereof. The program flow starts 70 and displays a change menu 7 1. The change menu 71 indicates various parameters including number of simulated test targets, target reflectivity, range(s) to target(s), atmospheric transmission and probability of target detection. Two function keys are also displayed indicating a return to the main menu (F1) and the task of measuring nominal energy (F2). The user is prompted to select 72 the laser parameter using the cursor arrows keys or mouse. Upon selection, the operator changes 73 the appropriate parameter value. After the change, the user is prompted to select 74 a function (F1, F2). Upon selection, the nominal energy is measured 75, or the user is returned to the main menu 76. If an improper key is depressed, the program loops to the selection screen 72.

FIG. 7 shows a third functional flow diagram of the software program employed by the REST system 3. This flow diagram illustrates an energy calibration procedure thereof. The program flow starts 80. It initializes 81 the shot counter "i" and average energy value "$E_{avg}$"; provides 82 a resets voltage 43 to the peak detector circuit 45 and programs 82 the D/A converter 13 to output a dc voltage 50 of 0 Vdc. If the laser rangefinder 1 is operated automatically by the computer 6 the laser rangefinder is fired 83. If the laser rangefinder 1 is operated manually, the operator is queried 83 to "Fire The laser rangefinder" under test. The laser rangefinder 1 fires and the peak detector voltage "$V_i$" for that laser pulse "i" is measured 84 by the DMM 12 and sent to the computer 6 where its measured value is stored. Simultaneous to this measurement, the output energy "$E_i$" for that laser pulse "i" is measured 85 by the energy detector 24; its value is displayed for the operator on the energy display 14 and the measured energy value is sent to the REST computer 6 for storage. The shot counter is checked 86 to determine if the upper limit of 100 pulses has been reached and if the number of pulses is less than 100, the program loops back and continues as before until a total of 100 shots of the laser rangefinder 1 have been fired. Once the 100 laser rangefinder pulses have been measured, the average output energy "$E_{avg}$" of the laser rangefinder 1 is calculated and stored in memory 87, the proportionality of peak detector voltage "$V_i$" to pulse output energy "$E_i$" is calculated 88, and the average proportionality of peak detector voltage to output energy "$E/V_{100}$", is calculated 89 and stored. The program then returns 90 to the main menu.

FIGS. 8a and 8b show a fourth functional flow diagram of the program used in the REST system 3. This flow diagram illustrates the test procedure thereof. The program flow starts 100 and calculates 101 the delay time or times for the ranges or ranges to the number of simulated test targets originally specified in the test parameters 63, 73. The delay time is a function of the time it would take the output laser beam from the laser rangefinder 1 to travel the specified target distance (range), at the speed of light, and return to the laser rangefinder. The calculated delay time or times, in the case of multiple simulated targets, is then programmed 102 into the delay generator 10.

The D/A converter 13 is programmed 103 to provide a dc sum voltage "$V_{D/A}$" 50 based on the average proportionality of peak detector voltage to output energy "$E/V_{100}$" and the average output energy "$E_{avg}$" of the laser rangefinder 1. The program then calculates 104 the nominal simulate received energy or energies "$E_{R-nom}$" from the simulated target or targets specified in the test parameters. The simulated received energy "$E_{R-nom}$" is determined by the range equation which is a function of the energy transmitted by the laser rangefinder 1, attenuated by factors for probability of target detection, target reflectivity, detector false alarm rate and computer modeled atmospheric transmission effects.

The setup assumes that the output energy of the first pulse of the laser rangefinder 1 during range testing will be equal to the average output energy "$E_{avg}$" previously 87 calculated. The shot counter "i" is initialized 106 and the peak detector circuit 45 is reset 107. If the laser rangefinder 1 is operated automatically by the computer 6 the laser rangefinder is fired 108. If the laser rangefinder 1 is operated manually, the operator is queried 108 to "Fire The laser rangefinder" under test. The laser rangefinder 1 fires and the output energy "$E_i$" for that laser pulse "i" is measured 109 by the energy detector 24, its value is displayed for the operator on the energy display 14, and the measured energy value is sent to the computer 6 for storage.

Simultaneous with this measurement, the summed voltage 44 of the peak detector output voltage 51 and the previously programmed D/A converter output voltage 50 is measured 110 by the DMM 12 and sent to the computer 6 where it is stored. The summed voltage 44 becomes the energy scaling factor "$V_{si}$" for shot "i" which modulates the output driver voltage 47 of the pulse generator 9 to take into consideration the pulse to pulse output variation of the laser rangefinder under test 1. If the laser rangefinder 1 is operated automatically by the computer 6 the computer acquires 111 the range distance measured by the laser rangefinder under test 1 and compares 112 this measured range to the number of targets and the simulated test target range that the REST system 3 was originally set to simulate.

If the laser rangefinder 1 is operated manually, the operator is queried 111 to acquire the measure range value from the laser rangefinder's display and enter this measured value into computer memory, the computer 6 then compares 112 the range measured by the laser rangefinder to the number of targets and the simulated test target range that the REST system 3 was originally set to simulate. The program checks 113 to see if the upper limit of test shots originally set 63, 73 has been reached. If the upper limit has not been reached the program loops back and continues as before until the total number of test shots has been reached. A test menu is then displayed 114, which provides 115 for a printing 116 of the test results and a return to the main menu 117.

A number of software modules are employed in the computer 6 in order to implement the above-described program, and these are explained below. It is to be understood that these modules are only representative of one of the many ways to implement the above program flow, and those skilled in the art of programming are readily capable of producing a program that implements the program described herein.

| Module name | Module description |
|---|---|
| autoexec.bat- | This module is automatically executed by an MS-DOS operating system and is used to execute a main executable module, master.exe. The master.exe module then takes over control and interfaces to the operator. |
| auto.c- | This module automatically sequences the tests in the order selected by a module seltst.c. When the test sequencing is completed, this module returns control to master.c. |
| borsight.c- | This module perform a laser boresight test. |
| ch_para.c- | This module is used to allow the operator to change default parameters of a test. This option is available in manual testing mode. |
| delay.c- | This module is used by the range.c module to set the appropriate delay programming of the delay generator 10. This delay is based on the range equation. It involves programming the pulse generator 9 to the specified delay when the trigger pulse is sent to the delay generator 10. |
| diverge.c- | This module performs a laser divergence test. |
| dsp_tdr.c- | This module displays the test data record data in a predefined format on a computer display screen. The test data record is displayed in a page-up and page-down scrolling mode. This module may also be used to display test data record data from past archived test data record data files |
| energy.c- | This module performs a laser energy test. |
| entdat.c- | This module queries the operator to enter certain test specific data, if any, such as the serial, part numbers, or test procedure (if more than one procedure is used with the program). |
| escale.c- | This module is used by the range.c module to set the energy output of the pulse generator 9 return simulation energy according to the calculated nominal energy. The actual energy is scaled from this value in real time by the computer 6. |
| g_choice.c- | This module waits for input selection by the operator from the list of available menu options. It returns the integer value corresponding to the selected menu option. This module also calls the help.c module if the operator hits the F1 function key on a computer keyboard. |
| get_tdr.c- | This module retrieves a previously archived test data record data file. It is then be displayed by the module dsp_tdr.c or printed on the printer by the module prt_tdr.c. |
| help.c- | This module displays a text window in which help information is displayed. An integer code is passed to this module representing the type of help to be displayed when the software is waiting for user input. For example, if the software is waiting for the user to input a menu selection, then that routine where the software is waiting (normally the module g_choice.c) passes an integer corresponding to the specific help window to be displayed to this module. |
| initdat.c- | This module initializes any data that needs to be initialized. A test data record is created if one does not already exist and the test data record is also initialized. |
| initste.c- | This module initializes system hardware including all IEEE-488 ports and devices, serial ports, printer port and switch matrices or scanners. |
| lrf.c- | This module is used by the module range.c to perform a laser ranging test. |
| manual.c- | This module is used to allow the operator to perform manual testing of the laser rangefinder 1 including full control of range testing. |
| Master.c- | This is the main program and contains a master menu from which the operator performs tests. This module acts as a shell program or application interface for the operator. |

| -continued | |
|---|---|
| Module name | Module description |
| menu.c- | This module displays a menu to allow user to select one from a menu of selections. It takes as input the number of options and a character array containing the names of the options and returns an integer corresponding to the option selected. |
| nominal.c- | This module is used to perform the measurement of the nominal energy output value for the laser rangefinder 1 by averaging 100 laser pulses. |
| options.c- | This module displays the options passed to the menu.c function in the window displayed by the window.c function. |
| prt_tdr.c- | This module prints the test data record data in predefined format on a printer. This module may also be used to print test data record data from past archived test data record data files. |
| pulse.c- | This module performs a laser pulse width test. |
| range.c- | This module performs a laser ranging test. |
| reprate.c- | This module performs a laser pulse repetition rate test. |
| res_con.c- | This module is used to set the pulse generator 9 to the measured nominal energy calculated by the module, res_ergy.c. |
| res_ergy.c- | This module is used to measure the energy of each laser pulse while calculating a running average of 100 pulses of the laser rangefinder's laser. |
| rest.c- | This module is used to perform simulated laser ranging testing using the REST system 3. |
| sav_tdr.c- | This module archives test data to a Txxxxx. test data record binary data file on a hard disk. This file may be retrieved later by get_tdr.c to allow the operator to display or print archived test data. |
| seltst.c- | This module displays a menu of available tests and allows the user to select tests and the order in which to perform them. This information is passed on to the modules auto.c and manual.c. |
| window.c- | This module displays a window in which the menu is to be displayed. |

Thus there has been described new and improved laser test equipment that provides for laser range simulation. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Laser range simulation apparatus for testing a laser rangefinder, said apparatus comprising:
 a laser energy detector means for measuring the output energy of the laser rangefinder, and for measuring the pulse to pulse energy variation of laser pulses provided by the laser rangefinder;
 a laser transmitter for providing a simulated target return signal;
 optics disposed between the laser rangefinder and the laser transmitter that are adapted to characterize the simulated return signal so that it is optically representative of a laser reflection from a real world target;
 a programmable laser pulse generator coupled to the energy detector means and laser transmitter for sensing the firing of the laser rangefinder and for firing the laser transmitter at a predetermined delay time subsequent to the firing of the laser rangefinder that corresponds to a predetermined target range; and
 a computer coupled to the programmable laser pulse generator, the delay generator and energy detector means for measuring the intensity of the output energy received by the laser energy detector, for calculating the firing delay time for firing of the laser transmitter that simulates the predetermined target range, for firing the laser transmitter after the calculated firing delay time, for calculating an energy scaling factor that controls the intensity of the energy provided by the laser transmitter based on values of target range, target reflectivity, atmospheric attenuation, optical losses of the optics, and the intensity of the output energy received from the laser rangefinder, for calculating the range that should be displayed by the laser rangefinder, and for comparing the calculated range to the range displayed by the laser rangefinder.

2. The laser range simulation apparatus of claim 1 further comprising:
 a delay generator coupled between the laser energy detector means and the programmable laser pulse generator for sensing the firing of the laser rangefinder and for determining a plurality of delay values that are representative of a plurality of target ranges, and for providing a plurality of signals to the programmable laser pulse generator that cause the laser transmitter to fire-a respective plurality of times that simulate target return signals corresponding to a plurality of target ranges.

3. The laser range simulation apparatus of claim 1 further comprising:
 an optical collector disposed between the laser rangefinder and the laser energy detector means.

4. Laser range simulation apparatus for testing a laser rangefinder having a transmitter and a receiver, said apparatus comprising:
 a laser energy detector for measuring the output energy of the laser rangefinder;
 a laser transmitter that operates at substantially the same wavelength as the laser rangefinder for providing a simulated target return signal;
 optics disposed between the laser rangefinder and the laser transmitter that are adapted to characterize the simulated return signal so that it is optically representative of a laser reflection from a real world target;
 a programmable laser pulse generator coupled to the energy detector and to the laser transmitter for sensing the firing of the laser rangefinder and for firing the laser transmitter at a predetermined time subsequent thereto corresponding to a predetermined target range; and
 a computer coupled to the programmable laser pulse generator and to a laser transmitter for measuring the intensity of the laser radiation received by the laser energy detector and for correcting the intensity measurement for transmission losses of the optics, for calculating a firing delay time for firing of the laser transmitter that simulates the predetermined target range, for firing the laser transmitter after the calculated firing delay time subsequent to the receipt of a trigger signal from the laser rangefinder, for calculating an energy scaling factor that controls the intensity of the energy provided by the laser transmitter based on values of target range, target reflectivity, atmospheric attenuation, optical losses of the optics, and the intensity of the output energy received from the laser rangefinder, for programming the scaling factor into the laser transmitter, for calculating the range that should be displayed by the laser rangefinder, and for comparing the calculation to the range displayed by the laser rangefinder.

5. The laser range simulation apparatus of claim 4 further comprising:
a delay generator coupled between the laser energy detector and the programmable laser pulse generator for sensing the firing of the laser rangefinder and for determining a plurality of delay values that are representative of a plurality of target ranges, and for providing a plurality of signals to the programmable laser pulse generator that cause the laser transmitter to fire a respective plurality of times that simulate target return signals corresponding to a plurality of target ranges.

6. The laser range simulation apparatus of claim 4 further comprising:
an optical attenuator disposed between the laser rangefinder and the laser energy detector.

* * * * *